M. J. LAUBY.
DRAW BAR CONSTRUCTION.
APPLICATION FILED JAN. 27, 1919.
1,305,472.    Patented June 3, 1919.
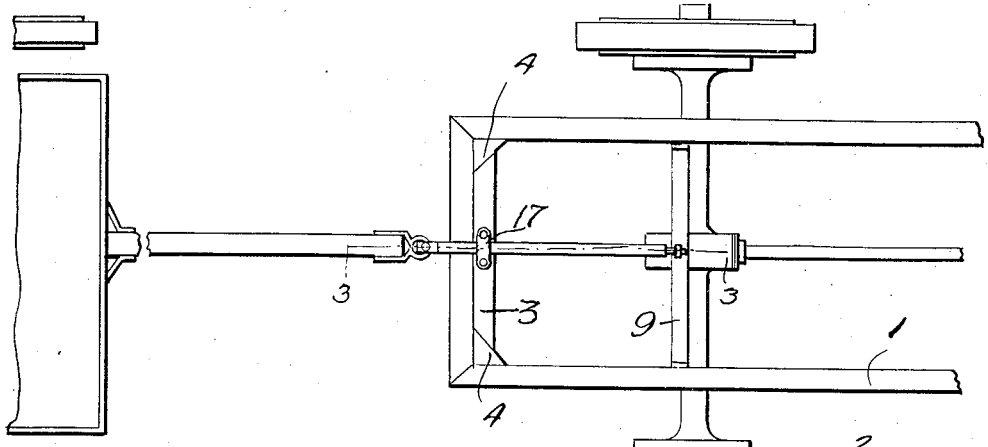
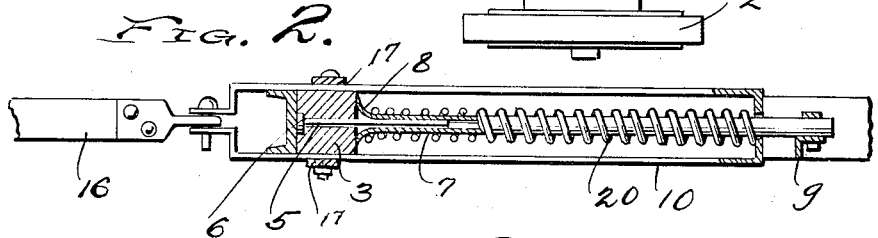
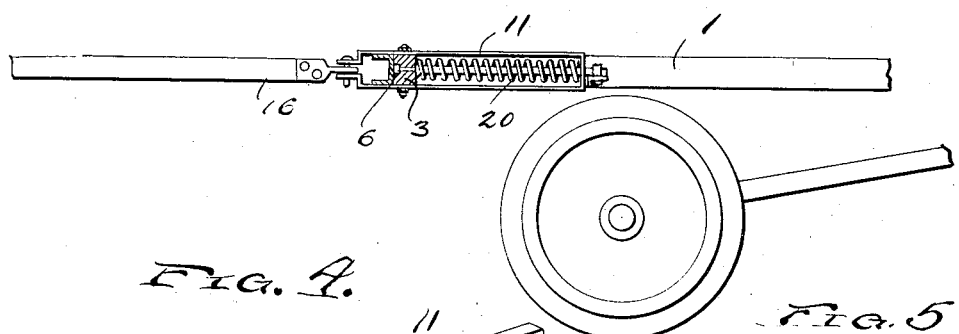
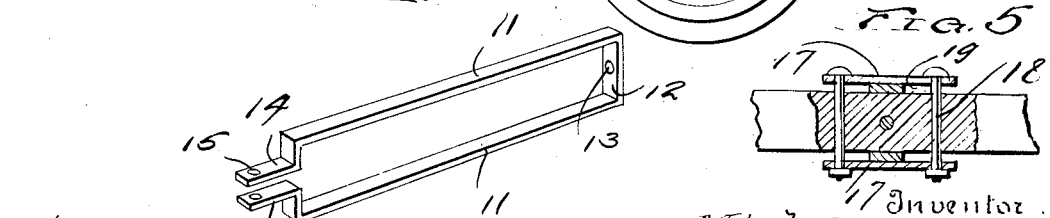
Witnesses                Inventor
                         Michael J. Lauby
                    By
                         Attorney

UNITED STATES PATENT OFFICE.

MICHAEL J. LAUBY, OF LEXINGTON, NEBRASKA.

DRAW-BAR CONSTRUCTION.

1,305,472.   Specification of Letters Patent.   Patented June 3, 1919.

Application filed January 27, 1919. Serial No. 273,404.

*To all whom it may concern:*

Be it known that I, MICHAEL J. LAUBY, a citizen of the United States, residing at Lexington, in the county of Dawson and State of Nebraska, have invented certain new and useful Improvements in Draw-Bar Constructions, of which the following is a specification.

This invention relates to draw bars and more particularly to an improved construction for draw bars used for towing purposes.

The primary object of the invention is to provide a towing connection between a truck and a trailer which will have sufficient resiliency to prevent sudden strain and stress on the engine and truck when a heavy load is being hauled.

Another object of the invention is to provide a draw bar adapted to be readily attached to the rear of a truck whereby a convenient coupling member is provided for attaching the tongue of a trailer so that a strong connection will be made at the same time providing the desired resiliency.

The invention further aims to provide a draw bar of this character which may be readily mounted on the rear of a truck frame in a manner that will maintain the device in position without making any direct rigid connection by fastening means or the like with the truck frame.

A further object of the invention is to provide a device of this character which consists of comparatively few parts and is simple in construction but durable and well adapted to withstand the rough usage to which devices of this character are ordinarily subjected.

For a full description of the invention and the advantages and merits thereof, reference is to be had to the following description and accompanying drawings, in which:—

Figure 1 is a plan view of the device mounted in position on the frame of the truck and showing it connected to the tongue of the trailer.

Fig. 2 is an enlarged longitudinal section.

Fig. 3 is a relatively small longitudinal section showing the relative position of the draw bar, truck, and trailer tongue.

Figs. 4 and 5 are details of the invention.

Referring to the drawings, wherein is illustrated the preferred or approved form of my invention, in which like numerals of reference indicate like or corresponding parts throughout the several views, the truck includes the truck frame 1 supported by the rear axle and wheels 2, the rear of the truck frame extending considerably back of the axle in the usual manner as shown. A bolster 3 of a length equal to the width of the frame is placed in engagement with the end of the frame as shown, the ends being engaged and supported by the corner braces 4 so that the bolster will be held in position within the truck frame. Extended transversely through the bolster is a bolt 5 the head 6 of which is counter sunk in one side of the bolster while the opposite end of the bolt projects from the side of the bolster and receives one end of the tubular supporting rod 7. The tubular supporting rod 7 has one end flared to form the flange 8 which engages the side of the bolster 3 while the opposite end is mounted on a supporting bar 9 so that the tubular member 7 is held in horizontal position. The bar 9 has its ends attached to the side bars of the truck frame to maintain the same in position.

A yoke member 10 is mounted for longitudinal sliding movement and is shown in detail in Fig. 4 of the drawing. This yoke includes the parallel bars 11 which embrace the bolster 3 and have their ends connected by the end piece 12 which has an opening 13 through which the tubular supporting rod 7 is extended. The opposite end of the yoke includes the separate fingers 14 each of which has an opening to receive a pivot bolt 15 used to connect the tongue 16 to the fingers 14 as shown. The parallel members 11 are arranged on opposite faces of the bolster when the device is mounted in position and retaining plates 17 are provided on the upper and lower sides of the bolster, these retaining plates being held in position by the fastening bolts 18 and the latter are transversly spaced apart so that a space 19 between each plate and the adjacent face of the bolster is provided so that lateral movement of the yoke member is permitted when required. A coil spring 20 is interposed between the flange 18 and the end portion 12 of the yoke member. This coil spring being of the expansion type whereby the yoke member is normally urged inwardly of the frame whereby the spring has a tendency to draw the tongue 16 toward the truck when the device is in use.

When the apparatus is connected as shown, it will be obvious that when a load is placed on the trailer and the truck is started forwardly, the trailer will not jerk forwardly quickly as happens with the rigid type of draw bar and neither will the excessive strain and pull on the truck cause the engine to choke or assume the heavy strain too suddenly. On the contrary, the spring arrangement, which permits relative movement of the bolster and yoke member, will gradually pick up the load on the trailer so that the motor on the truck has ample time to pick up the load especially on up grade where the device is more desirable.

The foregoing description and accompanying drawing has reference to what might be considered to be the preferred or approved form of my invention. I desire it to be understood that I may make such changes in the construction, combination and arrangement of parts, materials, dimensions, et cetera, as may prove expedient and fall within the scope of the appended claims.

Having thus fully described my invention what I claim as new and desire to secure by Letters Patent,—is:—

1. A draw bar comprising a bolster, a hollow supporting rod, means carried by the bolster and engaging the hollow supporting rod to support the latter, a yoke member embracing the bolster and provided with an opening at one end to receive the said supporting rod, a spring element mounted on the supporting rod and engaging the yoke member to urge the yoke member toward one end of the rod, and means to maintain the yoke member in sliding engagement with the bolster.

2. A draw bar adapted to connect a truck frame and a trailer tongue, a bolster mounted on the truck frame, a bolt carried by the bolster, a supporting rod having one end connected to the bolt, the opposite end being supported to maintain the said supporting rod in horizontal position, the yoke member embracing the said bolster and slidably mounted on the said rod, resilient means to normally urge the yoke member inwardly, the said tongue being connected to the opposite end of the yoke member, and means to maintain the said yoke member in sliding engagement with the said bolster.

In testimony whereof I affix my signature in presence of two witnesses.

MICHAEL J. LAUBY.

Witnesses:
  SIM BONSALL,
  R. HEUCKEY.